United States Patent [19]

Stinton et al.

[11] Patent Number: 5,075,160
[45] Date of Patent: Dec. 24, 1991

[54] CERAMIC FIBER REINFORCED FILTER

[75] Inventors: David P. Stinton, Knoxville; Jerry C. McLaughlin, Oak Ridge; Richard A. Lowden, Powell, all of Tenn.

[73] Assignee: Martin Marietta Energy Systems, Inc., Oak Ridge, Tenn.

[21] Appl. No.: 206,459

[22] Filed: Jun. 13, 1988

[51] Int. Cl.$^5$ ............................................. D04H 1/16
[52] U.S. Cl. .................................... 428/282; 210/505; 210/510.1; 423/447.1; 423/447.2; 427/228; 427/249; 427/250; 427/255.7; 428/247; 428/280; 428/284; 428/288; 428/367; 428/375; 428/380; 428/381; 428/384; 428/408
[58] Field of Search .................. 423/447.1, 447.2; 428/280, 282, 288, 284, 367, 375, 380, 381, 389, 408, 247; 427/228, 249, 250, 255.7; 210/505, 510.1

[56] References Cited

U.S. PATENT DOCUMENTS

| | | | |
|---|---|---|---|
| 3,991,248 | 11/1976 | Bauer | 428/245 |
| 4,275,095 | 6/1981 | Warren | 427/228 |
| 4,397,901 | 8/1983 | Warren | 428/101 |
| 4,580,524 | 4/1986 | Lackey et al. | 118/725 |
| 4,766,013 | 8/1988 | Warren | 427/228 |

OTHER PUBLICATIONS

Vu-Graphs for presentation of paper entitled "Ceramic Matrix Composites for Energy Conversion and Process Industry Use," E. L. Paquette et al., Refractory Composites, Inc., Whittier, CA., Presented at 32nd International SAMPE Symposium and Exhibition, 1987.
D. P. Stinton, et al., "Fiber-Reinforced Composite Hot-Gas Filters," 89th Annual Meeting, Am. Cer. Soc., Apr. 30, 1987, p. 180.
D. P. Stinton, et al., "Fiber-Reinforced Composite Hot-Gas Filters," USDOE Fossil Energy Mat'ls Prog. Conf. Proceedings, May 19-21, 1987, pp. 156-167.
US DOE Seventh Annual Gasification and Gas Stream Cleanup Systems Contractors Review Meeting, Jun. 16-19, 1987, Booklet.
DOE/METC-87/6079, vol. 1, Proceedings of 7th Annual Gasification & Gas Stream Cleanup Systems Contractors Review Meeting, M. R. Ghate, et al., ed., Jun. 1987, pp. 351-362.
"Ceramics at the Cutting Edge," L. M. Sheppard in Advanced Materials & Processes, Inc., Metal Progress, Aug. 1987, p. 73.

*Primary Examiner*—James J. Bell
*Attorney, Agent, or Firm*—J. Donald Griffin; Ivan L. Ericson

[57] ABSTRACT

A filter for removing particulate matter from high temperature flowing fluids, and in particular gases, that is reinforced with ceramic fibers. The filter has a ceramic base fiber material in the form of a fabric, felt, paper of the like, with the refractory fibers thereof coated with a thin layer of a protective and bonding refractory applied by chemical vapor deposition techniques. This coating causes each fiber to be physically joined to adjoining fibers so as to prevent movement of the fibers during use and to increase the strength and toughness of the composite filter. Further, the coating can be selected to minimize any reactions between the constituents of the fluids and the fibers. A description is given of the formation of a composite filter using a felt preform of commercial silicon carbide fibers together with the coating of these fibers with pure silicon carbide. Filter efficiency approaching 100% has been demonstrated with these filters. The fiber base material is alternately made from aluminosilicate fibers, zirconia fibers and alumina fibers. Coating with $Al_2O_3$ is also described. Advanced configurations for the composite filter are suggested.

20 Claims, 2 Drawing Sheets

CERAMIC FIBER REINFORCED FILTER

This invention arose under U.S. Department of Energy Contract No. DE-AC05-840R21400 with Martin Marietta Energy Systems, Inc.

TECHNICAL FIELD

This invention relates to filters for the removal of particulates from fluid streams, and more particularly to a fiber-reinforced ceramic filter for the removal of particulate materials from high temperature fluids such as high temperature gases.

BACKGROUND ART

Numerous technologies which will utilize coal are being developed as a way of improving the efficiency of fossil fuel systems. Typical of these technologies are combined-cycle coal gasification, combined-cycle pressurized fluidized bed combustion, direct coal-fired gas turbines, and coal gasification molten carbonate fuel cell systems. An important aspect of all of these technologies is the matter of handling the coal and combustion products in an environmentally acceptable manner. In many of these systems, the combustion (or other product) gases are to be directed to turbines for the production of electrical energy. However, sulfur, alkali metals, $NO_x$ and solid particulates must be removed from the gas stream to protect metallic components of the turbine system from corrosion and erosion. Some of these constituents can be removed chemically, and others must be physically removed.

Filter units are conventionally utilized for the physical removal of particulates in gaseous systems. However, those that are known in the past for many applications will not be satisfactory for these new techniques of fossil energy production. For example, most of the prior art filters cannot withstand the elevated temperatures approaching 1000 degrees C. Others are conventionally manufactured from materials that will not withstand the corrosive and erosive effects of the constituents of the gases. In order to utilize these conventional filter materials, the gases must be cooled prior to the filtering step. Then the gases are reheated for use in a turbine thereby significantly reducing the conversion efficiency of the system.

A number of techniques have been investigated for the removal of the particulates from high temperature gases (up to about 600 degrees C). For example, ceramic bag filters fabricated from ceramic cloth or felts have been utilized. These are usually fitted over some form of frame, e.g., a wire mesh, to provide stability during use. A typical method of cleaning these filters, as in any other type of filtering system, is to pass a gas in a reverse direction for a short period of time (pulse blow-back). However, the ceramic filters of the prior art are often destroyed by this cleaning as the fibers within the felt or cloth tend to move, or even break; thus, a hole is created. While this type of filter can be used for a period of time, the filter efficiency becomes greatly reduced as the holes are created.

A second type of filter, referred to as a dense "candle" filter, consists of silicon carbide particulates bonded together by a clay matrix which becomes a glass upon firing. This structure results in thick walls making the filters relatively heavy. Furthermore, because of the high density and thickness, these filters are subject to thermal shock, particularly during the pulse cleaning step.

Typically, these prior art ceramic filters have been fabricated from SiC or aluminosilicate fibers of a form that is relatively impure, often containing additives to aid in forming the filters. This creates a potential problem of chemical reactions with constituents of the gas, such as with sodium. For example, sodium is known to form a relatively low melting eutectic with silicon oxides at temperatures in the range of potential operation of the filter; thus, creating an additional problem with these filters of the prior art.

Although the following art does not deal with the preparation of ceramic fiber reinforced filters, the use of chemical vapor deposition techniques are taught with regard to fiber-containing preforms. U.S. Pat. No. 4,580,524, issued to W. J. Lackey, et al. on Apr. 8, 1986, describes a process of preparing fiber-reinforced composites (all interstices filled) by chemical vapor deposition. Numerous references cited therein relate to similar technologies for producing fully infiltrated composites and equipment to effect the same. Some of the references deal with the infiltration of yarn, woven cloth (carbon) and three dimensional preforms to fully fill the pores thereof. Various carbides, including SiC are used.

Other references that are generally related to the present invention are U.S. Pat. Nos. 4,275,095 and 4,397,901, issued to J. W. Warren on June 23, 1981 and Aug. 9, 1983, respectively. The technology of these patents is also concerned with infiltration, by CVD techniques, of a fibrous substrate. These teach the use of a pyrolytic carbon sheath formed on each fiber before the deposit of a metallic refractory.

Accordingly, it is an object of the present invention to provide a filter for the removal of particulates from high temperature fluids, such as gases, that can be utilized at the temperature needed for operation of a power-producing turbine.

It is another object of the invention to provide a ceramic fiber filter that will withstand periodic cleaning as with pulse blow-back.

Another object of the present invention is to provide a filter material that can be formed into shapes most practical for the removal of particulates, with the resultant filter unit having sufficient strength such that metallic or other structural components are not needed for support.

A further object of the invention is to provide a filter that is substantially resistant to corrosion, erosion and chemical attack from the constituents of the gas during high temperature operation for the removal of particulates from the gas stream.

These and other objects of the present invention will become apparent upon a consideration of the drawings referred to hereinafter and the complete description thereof.

DISCLOSURE OF THE INVENTION

In accordance with the present there is provided a filter having a thin and extended layer of a ceramic felt, paper or the like in the form of a preform made up of ceramic (refractory) fibers, with this felt, paper, etc., having a sufficiently small pore size as to remove particulates from fluids passing through the filter. The fibers within the preform are then coated with a selected compatible ceramic (refractory) material by chemical vapor deposition whereby the fibers are physically joined to each other to provide rigidity and strength, and to prevent movement during pulse blow-back as well as make the fibers more resistant to chemical attack. In one embodiment, the filter is typically fabricated from a preform felt of silicon carbide (SiC) fibers, and coated with a thin layer of SiC to join and coat each of the fibers with a very thin coating so as to maintain the desired pore size of the filter. This coating is achieved by suitably decomposing a selected silicon- and carbon-containing gas (or gases). When desired or necessary, the preform can be provided with a filament winding or an open cloth on one or both surfaces prior to the coating process so as to bond the cloth to the preform. In the preferred embodiment, a thin layer of pyrolytic carbon or similar material is applied to the components of the filter prior to the application of the refractory coating.

BEST MODE FOR CARRYING OUT THE INVENTION

One suitable material for the fabrication of improved ceramic fiber reinforced filters is a felt of silicon carbide fibers such as "Nicalon" available from the Nippon Carbon Company, Tokyo, Japan. These Nicalon felts are typically about ⅛ inch (30 mm) thick and are made from a three-dimensional array of continuous filaments of about 15 μm diameter. The average pore size of the felts has been determined to be about 100 μm. Because of the bridging of the fibers, and agglomeration of the particulates during filtering, the filters formed from these felts can effectively remove particles significantly smaller than 100 μm.

Other suitable starting materials for the fabrication of these improved filters are zirconia, alumina or aluminosilicate fibers. Aluminosilicate fibers are sold under the name "Nextel" by the 3-M Company, Minneapolis, Minn. These fibers can be woven into cloth, or fabricated into papers or felts from fibers of about 4–8 μm diameter, and have pore sizes ranging from between about 5 and 20 μm.. This fabric can be textured, if desired, to reduce the average pore size and increase filtering efficiency.

As used hereinafter, the term "base fiber material" is inclusive of felt, paper, etc., of refractory fibers having a pore size of about 100 μm or less. The ceramic fibers for the base fiber material can be selected from any fiber useful at the temperature of the fluid stream from which the particulates are to be removed.

As stated above, the improved ceramic fiber reinforced filters are produced by coating the fibers of the base fiber material with a pure coating that resists the effects of constituents of the high temperature fluids. Typically, this coating can be SiC or $Al_2O_3$ as deposited using conventional chemical vapor deposition (CVD) techniques. This coating serves several functions: the individual fibers are bonded to one another sufficiently to provide strength and prevent relative movement during use of the filter or during pulse blow-back cleaning; high fracture toughness is provided to the composite filter; and provides a coating of an essentially pure material that is less susceptible to chemical reactions with constituents of the fluid.

Figure 1:
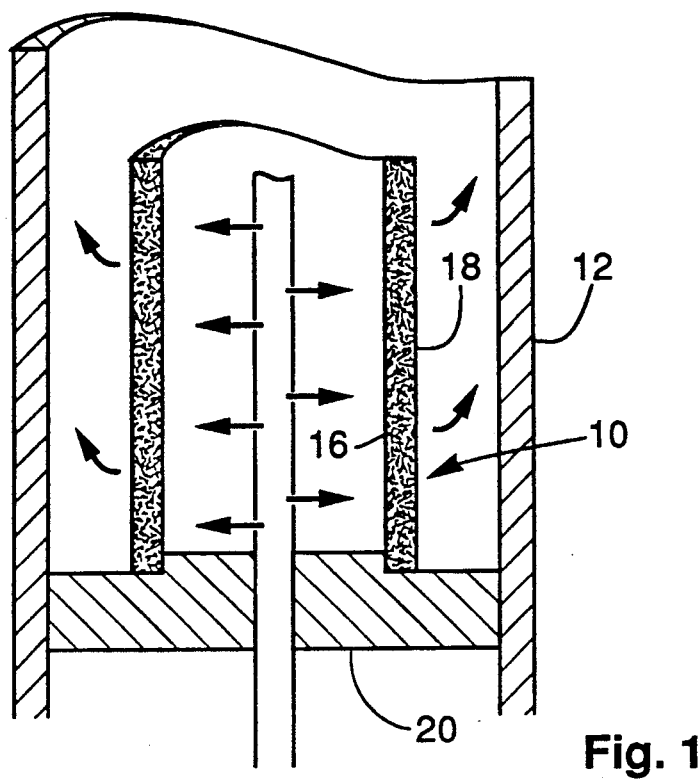
FIG. 1 is a drawing illustrating a typical method for producing a candle-type filter of the present invention utilizing a fibrous filter preform fabricated of selected ceramic fibers.

An illustration of a typical application of an SiC coating to the fibers of a felt appears in FIG. 1. A unit of base fiber material 10 is placed in a free standing manner within a heating element 12 such that reactant gases 14 pass from one surface 16 toward the opposite surface 18. This base fiber material is supported by any suitable means, such as a graphite holder 20 as illustrated. The specific gases utilized for the SiC deposition are methyltrichlorosilane ($CH_2SiCl_3$) plus hydrogen ($H_2$), although other gases are known in the art for producing CVD silicon carbide. The base fiber material is typically maintained at a temperature of about 1200 degrees C. Excess reactant gases, as well as HCl gas, are continuously exhausted.

The gas flow of the reactant gases, as well as the time of deposition, were maintained to provide only a minimum coating thickness in order to reduce the weight of the filter. Typically, the flow rates range from about 0.2 g/min to about double that rate. The "run time" for the coating step typically ranged from about 2 hours to about 4 hours. A layer of SiC on the fibers under these conditions was typically between 1 and 10 μm. Preferably, a thin layer of pyrolytic carbon or similar material is applied to base fiber material prior to the deposition of the SiC (or other coatings). The term "thin", when used with this carbon coating means less than 1 μm, and typically about 0.1 to 0.3 μm. This thin carbon coating, as applied by methods known in the art using a hydrocarbon gas, is added to modify or control the fiber matrix interface and protect the fibers during at least the initial deposition of the SiC.

Although the apparatus of FIG. 1 illustrates the deposition of SiC, it can be used to deposit other appropriate coatings. For example, the reactant gases can be aluminum trichloride ($AlCl_3$) and carbon dioxide ($CO_2$), plus hydrogen ($H_2$) to produce a coating of alumina ($Al_2O_3$) on the base fiber material. This deposition is typically carried out at about 1050 degrees C.

Figure 2A:
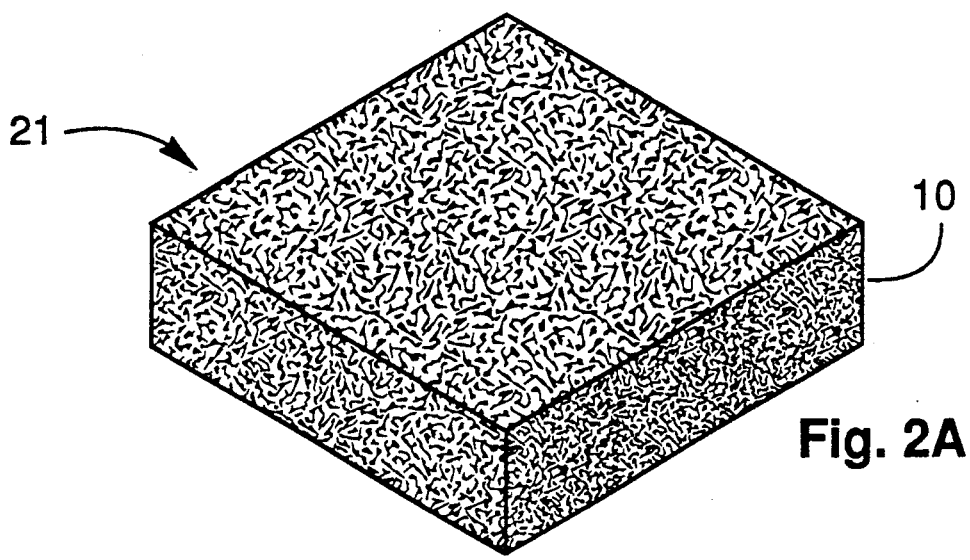
FIGS. 2A, 2B, and 2C are isometric drawings illustrating fragmentary portions of embodiments of a filter unit developed for accomplishing the above-stated objects of the present invention.
Figure 2B:
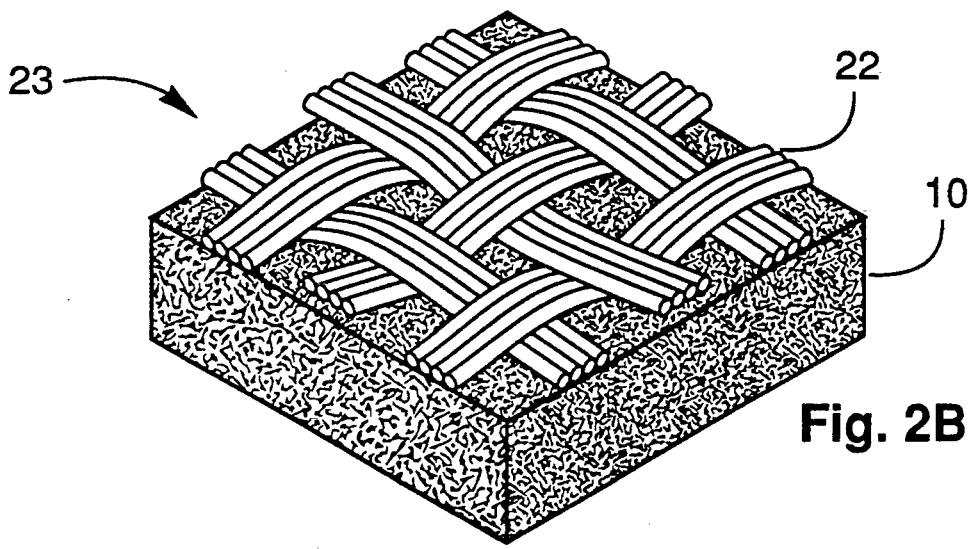
Figure 2C:
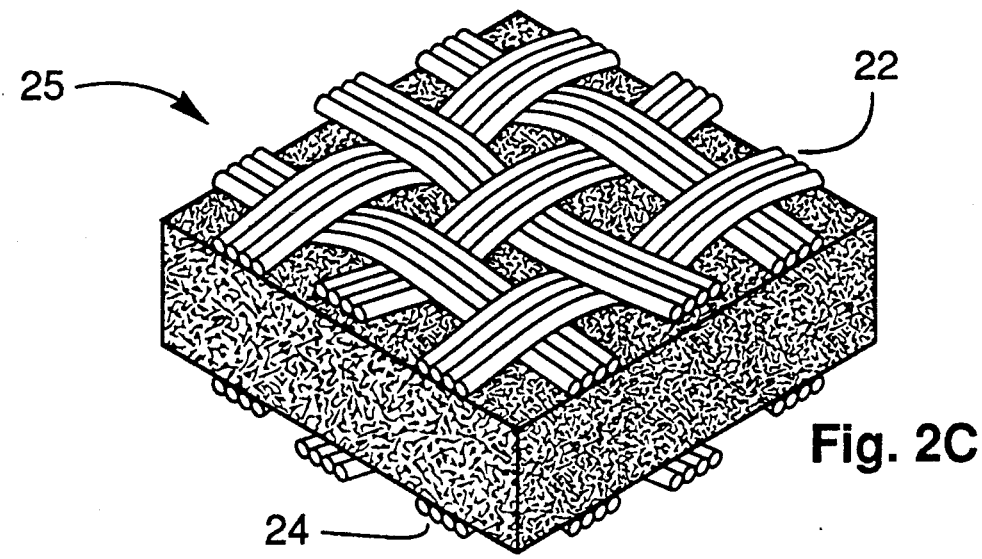

Several physical forms of the Nicalon base fiber material were utilized for the forming of the improved filter. These are illustrated in FIGS. 2A, 2B and 2C. It will be understood that these figures depict just a segment or fragment of a total filter element. In FIG. 2A, for example, a plain felt 10 of the Nicalon was converted into the filter 21 by the coating of the fibers with silicon carbide. In order to provide additional strength to the composite filter, an open weave Nicalon cloth 22 was applied to the felt 10 as illustrated in filter 23 of FIG. 2B. During the coating process, the SiC bonded the cloth 22 to the felt 10 in an inseparable manner. The filter embodiment 25 of FIG. 2C illustrates the "sandwiching" of the felt 10 between a first Nicalon cloth layer 22 and a second Nicalon cloth layer 24. In this embodiment, both cloth layers 22, 24 became bonded to the felt 10 during the coating process. The following Table I is illustrative of the preparation of composite filters of the types shown in FIGS. 2B and 2C.

The filtering efficiency of the filter specimens of Table I was determined for flyash and gasifier char. The flyash had a particle density of 2.87 g/cm³ and a particle diameter of 4.5 μm. The gasifier char had a particle density of 2.18 g/cm³, a particle diameter of 5.5 μm and had a smoother surface than the fly ash. These particles were suspended in an air stream, and the filter efficiency was determined. The results of these experimental tests are listed in the following Table II.

The initial test described in Table II were performed at face velocities of 11 to 22 cm/s using flyash at 200 degrees C. The test specimen with the highest amount of deposited silicon carbide (No. 20) and the specimen with the least amount (No. 23) showed about the same results at the tested face velocities. For specimen 20, decreasing the face velocity from 22.2 cm/s to 11.0 cm/s did not appear to have any major effect on dust removal efficiency or cleanability of the fabric.

TABLE I

| Specimen Number | Reactant Gas Concentration (g/min) | Run Time (h) | Deposition Temperature (Degrees C.) | Filter Design |
|---|---|---|---|---|
| 23 | 0.21 | 2 | 1200 | Plain weave Nicalon upstream and downstream, felt in middle |
| 20 | 0.42 | 4 | 1200 | Plain weave Nicalon upstream and downstream, felt in middle |
| 17 | 0.42 | 4 | 1200 | Open satin weave Nicalon upstream only, felt backing |
| 24 | 0.21 | 4 | 1200 | Plain weave Nicalon upstream and downstream, felt in middle |
| 16 | 0.24 | 4 | 1200 | Plain weave Nicalon upstream and downstream, felt in middle |
| 21 | 0.42 | 2 | 1300 | Plain weave Nicalon upstream and downstream, felt in middle |

TABLE II

| Test Number | Specimen Number/ Test Dust | Test Conditions | Collection Efficiency | Test Time (h) |
|---|---|---|---|---|
| 1 | 23/flyash | 200 degrees C. 21.7 cm/s | 99.7% | 4 |
| 2 | 20/flyash | 200 degrees C. 22.2 cm/s | 99.3% | 4 |
| 3 | 20/flyash | 200 degrees C. 11.0 cm/s | 99.4% | 4 |
| 4 | 17/flyash | 200 degrees C. 20.5 cm/s | 99.5% | 4 |
| 5 | 24/flyash | 200 degrees C. 2.5 cm/s | 99.2% | 4 |
| 6 | 24/flyash | 800 degrees C. 2.5 cm/s | >99.9% | 4 |
| 7 | 24/flyash | 200 degrees C. 2.7 cm/s | >99.9% | 4 |
| 8 | 24/Gasifier char | 200 degrees C. 2.7 cm/s | 97.0% | 5 |
| 9 | 20/Gasifier char | 200 degrees C. 3.0 cm/s | 99.7% | 5 |
| 10 | 16/Gasifier char | 200 degrees C. 3.0 cm/s | 99.4% | 11 |
| 11 | 21/Gasifier char | 800 degrees C. 3.5 cm/s | >99.9% | 50 |

Specimen 17 had woven fabric on the upstream side only. The pressure drop across the filter increased rapidly after about 3 hours of testing. Use of a higher cleaning pulse pressure (0.36 MPa versus 0.18 MPa) or increasing the cleaning frequency did not slow the increase in the pressure drop.

Specimen 24 was tested at a lower face velocity of about 2.5 cm/s and at 200 degrees C. and 800 degrees C. With the exception of the first four hours of testing (test 5), the collection efficiency was higher at the lower face velocities (>99.9% for test 6 and 7). At the end of testing with flyash dust, specimen 24 was reused for testing with gasifier char.

Specimen 20 was also retested using gasifier char at 200 degrees C. and at a face velocity of 3.0 cm/s. The initial collection efficiency of 99.5% gradually improved to 99.7%. When the filter specimen was removed, no char was noticeable on the downstream side.

Specimen 16 was tested with gasifier char at 200 degrees C. and a face velocity of 3.0 cm/s. Specimen 16 was a new sample as compared to specimen 20 which had been used for testing with flyash dust prior to testing with char. Slightly lower collection efficiencies were measured.

After the short duration tests showed promising results, a specimen was selected for longer duration testing at high temperatures. Specimen 21 was tested at 800 degrees C. for 50 hours. After an initial collection efficiency of about 99.6%, the filter collection efficiency improved to >99.9%. There was no noticeable damage to the filter and no char was observed on the downstream side of the filter.

An ideal filter should retain 100% of the particulates at the surface since particulates that penetrate into the filter medium could not likely be removed during the cleaning cycle. Results from testing the above-described composite filter specimens demonstrated collection efficiencies that were uniformly high even at very high face velocities. There did not appear to be cleanability problems with the small filter specimens.

Although very high particle removal rates were obtained with the composite filters using Nicalon fiber preforms, ceramic paper provides a means for having a more closely controlled pore size. Typically, the aluminosilicate papers (Nextel) is fabricated from continuous filaments of about 4–8 μm. These fibers will require a thinner coating and, thus, will result in a lighter weight composite filter. The fibers of these ceramic papers can be coated with SiC, $Al_2O_3$ and other such chemical vapor deposited materials giving rise to the same benefits as described above.

Figure 3A:
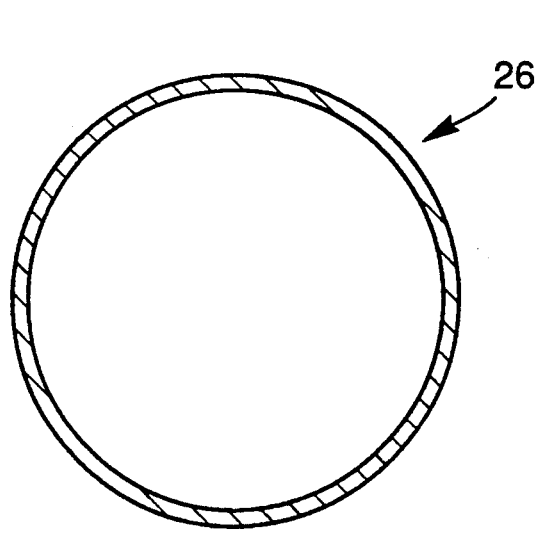
FIGS. 3A and 3B are drawings illustrating transverse cross sections of typical forms of the present invention as useful for the removal of particulates from high temperature gases and other fluids.
Figure 3B:
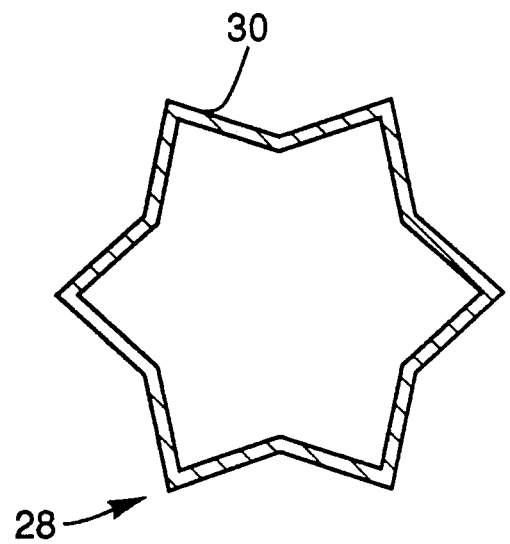

Although the experimental composite filters of the present invention are illustrated as flat surfaces, other configurations may be of greater benefit for practical applications. Two such configurations are illustrated in FIGS. 3A and 3B. FIG. 3A, for example, depicts a cylindrical filter configuration 26. The "upstream" side can be, for example, the interior of the cylinder. Pulse cleaning would occur from the outside. Of course, a reversal of the directions can be utilized. This configuration can be further strengthened with a cloth, as described above, or with a spirally wound filament (not shown) that would be bonded during the coating step. This construction results in a "candle" filter since the filter can be hung from only a top support in the manner of making candles. For this type of filter, any saving of weight is important.

The surface area of candle filters can be increased significantly by corrugating the surface prior to the deposition of the coating. This construction is illustrated in the cross-section of a filter 28 depicted in FIG. 3B. Although six corrugations 30 are illustrated, this number can be increased significantly if desired. Other configurations can be used as will be understood by those versed in the art. In all of the Figures it can be seen that the base fiber material, and thus the resultant filter, has a substantially uniform thickness between a first surface and a second surface.

From the foregoing, it will De understood that an improved filter has been developed for the removal of particulate matter from fluids. More particularly, these filters are ceramic fiber reinforced so as to increase resistance to damage during use while reducing weight of the filters. An appropriate thin base fiber material (felt, paper, etc.) is treated so as to coat each fiber thereof with a protective material that, in addition, bonds each fiber to the other fibers. This coating is achieved by chemical vapor deposition techniques. The base fiber material can be fabricated from silicon carbide fibers, zirconia fibers, alumina fibers or similar generally inert high temperature refractory materials. The coating can be, for example, a refractory such as SiC or $Al_2O_3$. Also, the coating can be a suitable product of chemical vapor deposition that is non-reactive with the fiber base material and the constituents of the fluid constituents.

The filters described herein have particular applications for filtering the effluent gases from advanced technology in the production of electrical energy from fossil fuels. However, the filters are not limited by these applications, since these are given only as illustrations of the applications to which the filters apply. Rather, the filters of the present invention are to be limited only by the appended claims and their equivalents when read in combination with the foregoing detailed description.

We claim:

1. A filter element for removing particulate matter from high temperature fluid streams, which comprises:
   a preform base fiber material of selected refractory fibers defining a substantially uniform thickness between a first surface and a further surface, said preform having a selected average pore size between said first and further surfaces; and
   a thin chemical vapor deposited coating of a selected refractory material on each said refractory fibers of said preform of a thickness sufficient to bond said refractory fibers without substantially affecting said selected average pore size to thereby prevent movement of said fibers and provide rigidity, strength and toughness during use of said filter element.

2. The filter element of claim 1 further comprising a thin layer of pyrolytic carbon applied to each said refractory fibers prior to said coating of said refractory material.

3. The filter element of claim 1 further comprising a reinforcing layer of a selected refractory material on at least one of said first and further surfaces of said preform, said reinforcing layer bonded to said preform by said coating of said refractory material.

4. The filter element of claim 1 wherein said selected average pore size is from about 1 $\mu$m to about 100 $\mu$m.

5. The filter element of claim 1 wherein said selected refractory fibers are selected from the group consisting of silicon carbide, alumina, zirconia and aluminosilicate.

6. The filter element of claim 5 wherein said coating of refractory material is selected from the group consisting of silicon carbide and alumina.

7. The filter element of claim 6 wherein said coating of refractory material has a thickness of about 1 to about 10 $\mu$m.

8. The filter element of claim 3 wherein said reinforcing layer is on both said first and further surfaces of said preform and bonded to said preform with said coating.

9. A filter element for removing particulate matter from a high temperature gas stream, which comprises:
   a preform base fiber material of refractory fibers selected from fibers of silicon carbide, alumina, zirconia and aluminosilicate, said preform defining a substantially uniform thickness between a first surface and a further surface, and having an average pore size between said first and further surfaces of about 1 to about 100 $\mu$m;
   a reinforcing layer of a refractory material on at least one of said first and further surfaces of said preform; and
   a chemical vapor deposited coating on each said refractory fibers and said reinforcing layer, said coating having a thickness of about 1 to about 10 $\mu$m of a refractory material selected from the group consisting of silicon carbide and alumina to sufficiently bond said refractory fibers to each other and to said reinforcing layer, without substantially affecting said average pore size, to thereby prevent movement of said fibers and to provide rigidity, strength and toughness during use of said filter element.

10. The filter element of claim 9 further comprising a thin layer of pyrolytic carbon applied to each said refractory fibers and said reinforcing layer prior to said coating of said refractory material.

11. The filter element of claim 10 wherein said refractory fibers are silicon carbide fibers, said average pore size is about 100 $\mu$m, said reinforcing layer is at least one filament of silicon carbide, and said refractory coating material is silicon carbide.

12. The filter element of claim 10 wherein said refractory fibers are silicon carbide fibers, said average pore size is about 100 $\mu$m, said reinforcing layer is at least one filament of silicon carbide, and said refractory coating is alumina.

13. The filter element of claim 10 wherein said refractory fibers are aluminosilicate, said average pore size is about 1 to about 10 $\mu$m, and said refractory coating is silicon carbide.

14. The filter element of claim 10 wherein said refractory fibers are aluminosilicate, said average pore size is about 1 to about 10 $\mu$m, and said refractory coating is alumina.

15. The filter element of claim 9 wherein said preform is a felt of a three-dimensional array of continuous silicon carbide fibers, said preform having a thickness of about 30 mm, and said reinforcing layer is a cloth of silicon carbide fibers.

16. A filter element for removing particulate matter from a high temperature gas stream, which comprises:
   a preform felt-type base fiber material of silicon carbide fibers, said preformed base fiber material defining a substantially uniform thickness between a first surface and a further surface and having an average pore size between said surfaces of about 100 $\mu$m or less;
   a reinforcing cloth of silicon carbide fibers on at least one of said first and further surfaces;
   a thin layer of pyrolytic carbon coating on each said fibers of said base fiber material and said reinforcing layer; and a chemical vapor deposited coating of a refractory material, of about 1 to about 10 μm in thickness, applied to said pyrolytic carbon coating to one each said fibers sufficiently bond said fibers of said base fiber material and said reinforcing cloth to each other, without substantially affecting said average pore size, to prevent movement of said fibers of said preform base material and said reinforcing cloth and provide rigidity, strength and toughness during use of said filter unit, said coating of refractory material selected from the group consisting of silicon carbide and alumina.

17. The filter unit of claim 16 wherein said coating of refractory material is silicon carbide.

18. The filter unit of claim 16 wherein said coating of refractory material is alumina.

19. A filter element for removing particulate matter from a high temperature gas stream, which comprises:

a preform paper-type base fiber material of aluminosilicate fibers defining a substantially uniform thickness between a first surface and a further surface and having a average pore size between said surfaces of about 1 to about 10 μm;

a reinforcing layer applied to at least one of said first and further surfaces;

a thin layer of pyrolytic carbon on each said fibers of said preform and said reinforcing layer; and a chemical vapor deposited coating of a refractory material applied to said pyrolytic carbon coating on each said fibers to sufficiently bond said fibers of said base fiber material to each other and to said reinforcing layer to prevent movement of said fibers and said reinforcing layer, without substantially affecting said average pore size, said refractory material of said coating selected from the group consisting of silicon carbide and alumina.

20. The filter element of claim 19 wherein said fibers of aluminosilicate have an average diameter of about 4–8 μm; and said refractory material coating is alumina.

* * * * *